(12) United States Patent
Shand et al.

(10) Patent No.: US 7,835,312 B2
(45) Date of Patent: Nov. 16, 2010

(54) METHOD AND APPARATUS FOR UPDATING LABEL-SWITCHED PATHS

(75) Inventors: Ian Michael Charles Shand, Cobham (GB); Stewart Frederick Bryant, Redhill (GB)

(73) Assignee: Cisco Technology, Inc., San Jose, CA (US)

( * ) Notice: Subject to any disclaimer, the term of this patent is extended or adjusted under 35 U.S.C. 154(b) by 709 days.

(21) Appl. No.: 11/186,449

(22) Filed: Jul. 20, 2005

(65) Prior Publication Data

US 2007/0019652 A1    Jan. 25, 2007

(51) Int. Cl.
*H04L 12/28* (2006.01)
*H04L 5/22* (2006.01)
*G06F 17/00* (2006.01)

(52) U.S. Cl. ............... 370/299; 370/254; 370/238; 370/217; 370/221; 709/220; 709/242; 714/1; 714/2; 714/18; 714/25

(58) Field of Classification Search ............... 370/299, 370/254, 238, 217, 221, 220, 468, 389, 355, 370/331, 351; 709/242, 220, 221, 222; 455/433–439; 714/1, 2, 18, 25
See application file for complete search history.

(56) References Cited

U.S. PATENT DOCUMENTS

| | | | |
|---|---|---|---|
| 5,243,592 A | 9/1993 | Perlman et al. | |
| 5,825,772 A | 10/1998 | Dobbins et al. | |
| 6,002,674 A | * 12/1999 | Takei et al. ............ | 370/254 |
| 6,032,194 A | 2/2000 | Gai et al. | |
| 6,044,075 A | 3/2000 | Le Boudec et al. | |
| 6,061,650 A | 5/2000 | Malkin et al. | |
| 6,092,113 A | 7/2000 | Maeshima et al. | |
| 6,098,107 A | 8/2000 | Narvaez-Guarnieri et al. | |
| 6,128,750 A | 10/2000 | Espy et al. | |
| 6,148,410 A | 11/2000 | Baskey et al. | |
| 6,185,598 B1 | 2/2001 | Farber et al. | |

(Continued)

FOREIGN PATENT DOCUMENTS

CN     1440159 A     9/2003

(Continued)

OTHER PUBLICATIONS

International Searching Authority, "Notification of Transmittal of the International Search Report and the Written Opinion of the International Searching Authority, or the Declaration", international application No. pct/us06/28083, Received Nov. 30, 2007, 11 pages.

(Continued)

*Primary Examiner*—Aung S Moe
*Assistant Examiner*—Jamal Javaid
(74) *Attorney, Agent, or Firm*—Hickman Palermo Truong & Becker LLP

(57) ABSTRACT

A method of updating a label-switched path for forwarding data in a data communications network in response to a change in a network comprises the step, performed at an updating node of receiving notification of a network change, of constructing a post-change label-switched path in the changed network. The method further comprises, after termination of a first period, forwarding data using the post-change label-switched path.

20 Claims, 13 Drawing Sheets

U.S. PATENT DOCUMENTS

| | | | |
|---|---|---|---|
| 6,256,295 | B1 | 7/2001 | Callon |
| 6,349,091 | B1 | 2/2002 | Li |
| 6,356,546 | B1 | 3/2002 | Beshai |
| 6,473,421 | B1 | 10/2002 | Tappan |
| 6,507,577 | B1 | 1/2003 | Mauger et al. |
| 6,578,086 | B1 | 6/2003 | Regan et al. |
| 6,654,361 | B1 * | 11/2003 | Dommety et al. ........... 370/331 |
| 6,697,325 | B1 | 2/2004 | Cain |
| 6,704,320 | B1 | 3/2004 | Narvaez et al. |
| 6,711,125 | B1 | 3/2004 | Walrand et al. |
| 6,778,531 | B1 | 8/2004 | Kodialam et al. |
| 6,928,484 | B1 | 8/2005 | Huai et al. |
| 6,944,131 | B2 | 9/2005 | Beshai et al. |
| 6,965,937 | B2 | 11/2005 | Gaddis et al. |
| 6,982,951 | B2 | 1/2006 | Doverspike et al. |
| 6,996,065 | B2 | 2/2006 | Kodialam et al. |
| 7,058,016 | B1 | 6/2006 | Harper et al. |
| 7,061,921 | B1 | 6/2006 | Sheth |
| 9,009,286 | | 8/2006 | Swallow |
| 7,113,481 | B2 | 9/2006 | Elie-Dit-Cosaque et al. |
| 7,158,486 | B2 | 1/2007 | Rhodes |
| 7,349,427 | B1 | 3/2008 | Canning et al. |
| 2002/0037010 | A1 | 3/2002 | Yamauchi |
| 2002/0069292 | A1 | 6/2002 | Gaddis et al. |
| 2002/0093954 | A1 * | 7/2002 | Weil et al. ................... 370/389 |
| 2002/0116669 | A1 | 8/2002 | Jain |
| 2002/0131362 | A1 | 9/2002 | Callon |
| 2002/0136223 | A1 | 9/2002 | Ho |
| 2002/0171886 | A1 | 11/2002 | Wu et al. |
| 2002/0172157 | A1 | 11/2002 | Rhodes |
| 2003/0053414 | A1 | 3/2003 | Akahane et al. |
| 2003/0079040 | A1 | 4/2003 | Jain et al. |
| 2003/0123457 | A1 | 7/2003 | Koppol |
| 2004/0001497 | A1 | 1/2004 | Sharma |
| 2004/0001508 | A1 | 1/2004 | Zheng et al. |
| 2004/0028064 | A1 | 2/2004 | Cetin et al. |
| 2004/0071089 | A1 | 4/2004 | Bauer et al. |
| 2004/0085894 | A1 | 5/2004 | Wang et al. |
| 2004/0151181 | A1 | 8/2004 | Chu et al. |
| 2004/0185777 | A1 | 9/2004 | Bryson |
| 2004/0205239 | A1 | 10/2004 | Doshi et al. |
| 2005/0031339 | A1 | 2/2005 | Qiao et al. |
| 2005/0038909 | A1 | 2/2005 | Yoshiba et al. |
| 2005/0073958 | A1 * | 4/2005 | Atlas et al. ................... 370/238 |
| 2005/0097219 | A1 | 5/2005 | Goguen et al. |
| 2006/0007929 | A1 | 1/2006 | Desai et al. |
| 2006/0018253 | A1 | 1/2006 | Windisch et al. |
| 2006/0221962 | A1 | 10/2006 | Previdi et al. |
| 2006/0291391 | A1 * | 12/2006 | Vasseur et al. ............... 370/235 |
| 2007/0011284 | A1 | 1/2007 | Le Roux et al. |
| 2007/0291790 | A1 * | 12/2007 | Ue et al. ...................... 370/468 |
| 2008/0192762 | A1 | 8/2008 | Kompella et al. |
| 2009/0080431 | A1 | 3/2009 | Rekhter |

FOREIGN PATENT DOCUMENTS

| | | |
|---|---|---|
| WO | WO 01/78278 A1 | 10/2001 |
| WO | WO 02/06918 | 1/2002 |
| WO | WO 02/06918 A2 | 1/2002 |

OTHER PUBLICATIONS

Claims, international application No. pct/us06/28083, 3 pages.
U.S. Appl. No. 10/323,358, filed Dec. 17, 2002, Previdi et al.
U.S. Appl. No. 10/442,589, filed May 20, 2003, Bryant et al.
U.S. Appl. No. 10/976,076, filed Oct. 27, 2004, Swallow et al.
U.S. Appl. No. 10/340,371, filed Jan. 9, 2003, Miles et al.
A. Atlas et al., "IP/LDP Local Protection," Internet Engineering Task Force (IETF) draft-atlas-ip-local-protect-00.txt, Aug. 2004.
S. Bryant et al., "A Framework for Loop-Free Convergence," IETF draft-bryant-shand-lf-conv-frmwk-01.txt, Jun. 2005.
A. Zinin, "Analysis and Minimization of Microloops in Link-state Routing Protocols," IETF draft-zinin-microloop-analysis-01.txt, May 2005.
E. Rosen et al., "Multiprotocol Label Switching Architecture," IETF Request for Comments 3031 (RFC 3031), Jan. 2001.
M. Thorup, "Fortifying OSPF/IS-IS against link-failure," AT&T Laboratories, Sep. 7, 2001 (10 pg.).
AU Examiner's First Report for foreign patent application No. 2004311004 dated Jun. 23, 2008 (1 pg).
AU Examiner's Second Report for foreign patent application No. 2004311004 dated Aug. 18, 2008 (1 pg).
Current claims for AU foreign patent application No. 2004311004 (6 pgs).
Office Action from CN for foreign application No. 200480033007.8 dated Apr. 11, 2008 (10 pgs) with English translation (11 pgs).
Current claims for CN foreign patent application No. 200480033007.8 (6 pgs).
European Patent Office, "Supplementary European Search Report", application No. EP 04795045, May 27, 2009, 4 pages.
Claims, application No. EP 04795045, 4 pages.
Raju et al., "A New Approach to On-Demand Loop-Free Multipath Routing", Computer Communications and Networks, 1999, IEEE, Oct. 1999, XP010359531, ISBN: 978-0-7803-5794-5, 6 pages.
European Patent Office, "Supplementary European Search Report", application No. EP 06720965, dated Jul. 21, 2009, 6 pages.
Claims, application No. EP 06720965, 4 pages.
European Patent Office, "Communication pursuant to Article 94(3) EPC", Application No. 04795045.6-2416, dated Sep. 7, 2009, 5 pages.
Current Claims, Application No. 04795045.6-2416, 5 pages.
Office Action, Canadian Application No. 2,537,898 dated Feb. 15, 2010 (2 pgs).
Current claims for CA Application No. 2,537,898 (6 pgs).
Moy, J et al., "OSPF Version 2", IETF Standard, Network Working Group, Internet Engineering Task Force, IETF, Apr. 1998, XP015008112, NFC 2328, 245 pages.
European Patent Office, "Supplementary Search Report", application No. EP 04812468, dated May 27, 2010, 4 pages.
Claims, application No. EP 04812468, 4 pages.
European Search Report, application No. EPO 06 80 0142, dated Jun. 15, 2010 (8 pgs).

\* cited by examiner

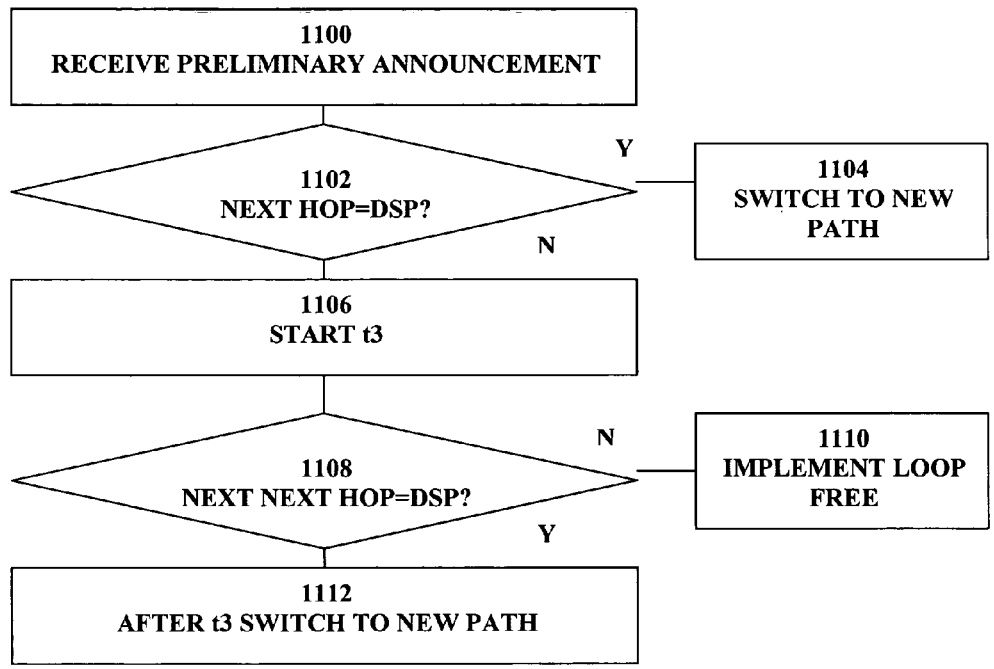
FIG. 11
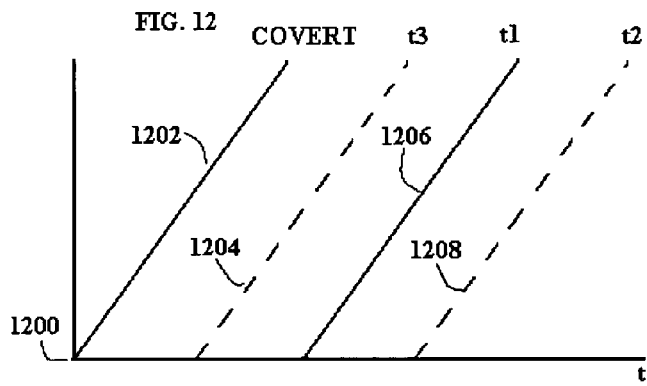

METHOD AND APPARATUS FOR UPDATING LABEL-SWITCHED PATHS

CROSS-REFERENCE TO RELATED APPLICATIONS

This application is related to prior US applications identified by Ser. No. 10/323,358, filed Dec. 17, 2002, and Ser. No. 10/442,589, filed May 20, 2003.

FIELD OF THE INVENTION

The present invention generally relates to label-switched paths. The invention relates more specifically to a method and apparatus for updating label-switched paths.

BACKGROUND OF THE INVENTION

In computer networks such as the Internet, packets of data are sent from a source to a destination via a network of elements including links (communication paths such as telephone or optical lines) and nodes (for example, routers directing the packet along one or more of a plurality of links connected to it) according to one of various routing protocols.

One such protocol is MPLS (Multi Protocol Label Switching). MPLS is a protocol that is well known to the skilled reader and which is described in document "Multi Protocol Label Switching Architecture" which is available at the time of this writing in the file "rfc3031.txt" in the directory "rfc" of the domain "ietf.org" on the World Wide Web. According to MPLS, a complete path for a source-destination pair is established, and values required for forwarding a packet between adjacent routers in the path together with headers or "labels" are pre-pended to the packet. The labels are used to direct the packet to the correct interface and next hop. The labels precede the IP or other header allowing smaller outer headers.

The path for the source-destination pair, termed a Label Switched Path (LSP) can be established according to various different approaches. One such approach is Label Distribution Protocol (LDP) in which each router in the path sends its label to the next hop router on the path as determined from its IP routing table. Alternatively Resource Reservation Protocol (RSVP) can be invoked in which case, for example, a network administrator can engineer a path, providing strict source routing. In either case a Label Forwarding Information Base (LFIB) stores both the next-hop information for the LSP, together with the label required by the next hop.

For each LSP created, a forwarding equivalent class (FEC) is associated with the path specifying which packets are mapped to it.

A problem in data communication networks arises upon de-activation of a network component such as a link or a node either by component failure or by planned down time. In either case there is a period of disruption to the delivery of traffic and packets for destinations which were previously reached by traversing the deactivated component may be dropped. In many time-critical applications it is not sufficient for the routers to converge on the adjusted network in a normal way as this takes too much time. Accordingly one known solution in MPLS networks is to pre-compute and pre-signal a repair path using RSVP methods. Such an approach can, however, require network administrator configuration of the repair paths.

An alternative approach is described in "ip/ldp local protection" which is available at the time of this writing in the file "draft-atlas-ip-local-protect-00.txt" in the directory "pub/id" of the domain "watersprings.org" on the World Wide Web. According to the approach described in this document, a computing node computes both a "primary next-hop" for packets for a destination together with an "alternate next-hop". The alternate next hop is used in the case of failure of the primary next hop (failure either of the next-hop node or the link to the next hop-node). The alternate next-hop can be another neighbor node whose own shortest path to the destination does not include the computing node. In another case the alternate next-hop is a "U-turn alternate" comprising a neighbor whose primary next hop is the computing node. And which has as its alternate next-hop a node whose shortest path does not include the computing node. However this approach can only redirect a packet over a maximum of two hops.

A further approach is described in co-pending patent application Ser. No. 10/976,076, filed 27 Oct. 2004 entitled "Method and Apparatus for Forwarding Data in a Data Communications Network" of George Swallow et al ("Swallow et al."), the entire contents of which are incorporated by reference for all purposes as set fourth herein and discussed in more detail below.

According to the solution put forward in Swallow et al. a repairing node repairs around a failed component to a target node from which data will be forwarded to its destination. In particular a repairing node constructs an LSP to a node at the intersection of a first set of nodes reachable from the repairing node and a second set of nodes from which the target node is reachable without traversing the failed component.

Further solutions have also been proposed in the case of IP packets using, for example, link state protocols.

The link state protocol relies on a routing algorithm resident at each node. Each node on the network advertises, throughout the network, links to neighboring nodes and provides a cost associated with each link, which can be based on any appropriate metric such as link bandwidth or delay and is typically expressed as an integer value. A link may have an asymmetric cost, that is, the cost in the direction AB along a link may be different from the cost in a direction BA. Based on the advertised information in the form of a link state packet (LSP) each node constructs a link state database (LSDB), which is a map of the entire network topology and from that constructs generally a single optimum route to each available node based on an appropriate algorithm such as, for example, a shortest path first (SPF) algorithm. As a result a "spanning tree" (SPT) is constructed, rooted at the node and showing an optimum path including intermediate nodes to each available destination node. Because each node has a common LSDB (other than when advertised changes are propagating around the network) any node is able to compute the spanning tree rooted at any other node. The results of the SPF are stored in a routing information base (RIB) and based on these results the forwarding information base (FIB) or forwarding table is updated to control forwarding of packets appropriately. When there is a network change an LSP representing the change is flooded through the network, each node sending it to each adjacent node. However no solutions are currently proposed for supporting multi-topology routing in the multi protocol switching (MPLS) forwarding environment.

As a result, when a data packet for a destination node arrives at a node (the "first node"), the first node identifies the optimum route to that destination and forwards the packet to the next node along that route. The next node repeats this step and so forth.

One such solution is described in co-pending patent application Ser. No. 10/340,371, filed 9 Jan. 2003, entitled "Method and Apparatus for Constructing a Backup Route in a Data Communication Network" of Kevin Miles et al ("Miles et al"), the entire contents of which are incorporated by reference for all purposes as fully set forth herein. In this case a repairing node tunnels repair packets to a node at the intersection of the first and second sets of nodes.

When a link or a node fails and is subsequently repaired, or there is some other change to the network such as a change of link cost, the routers involved with the repaired part of the network then have to re-establish convergence. This is achieved by the router(s) advertising themselves or the change throughout the network area. However during topology change there will be a short period of time in which LSDBs, RIBs and, critically, FIBs across a network become inconsistent as information about a change is propagated through the network. Routes generated during this period of inconsistency may result in routing loops, which persist until the databases have converged (at which point there should be no loops, by definition). As an example, if a first node sends a packet to a destination node via a second node, comprising the optimum route according to the first node's SPF, a situation can arise where the second node, according to it's SPF (based on a different LSDB from that of the first node) determines that the best route to the destination node is via the first node and sends the packet back. The loop can happen where the first node, according to its LSDB believes that a link cost is lower than the second node does, according to its LSDB. This can continue indefinitely although usually the packet will have a maximum hop count after which it will be discarded. Such a loop can be a direct loop between two nodes or an indirect loop around a circuit of nodes. Re-convergence will typically take several hundred milliseconds and hence may cause disruption for periods greater than that originally caused by the failure.

Such a problem can be understood with reference to FIG. 1 and FIG. 2 which are illustrative network diagrams showing a network in which such a problem can arise. Referring to FIG. 1, a network designated generally 100 includes node A, B, C, E, F, G, H and a destination node B, reference numerals 102, 104, 106, 108, 110, 112, 114 and 116 respectively. Each of the nodes excepting node D is connected in sequence, ordered node H, G, F, E, C, A, B. Both of nodes B and H provide a route to destination node D. Each node includes forwarding information including an LFIB for MPLS forwarding. In particular nodes A, C, E, F, G have forwarding information shown at 118, 120, 122, 124, 126 respectively. Thus, for IP packets received at node A destined for node D, the next hop is node B and node B's label for D, Db is appended. For MPLS packets belonging to the FEC for destination D the LFIB contains next hop B and, once again, B's label Db. For example where node A receives an MPLS packet from node C with A's ingress label for D, Da, node A replaces the label with Db and forwards it to next hop node B. Similarly, node C has, as next hop, node A and label Da for IP packets destined for node D and MPLS packets in the corresponding FEC. Node E has label Dc and next hop C and node F has label De and next hop node E. However the shortest route from node G to node D is via node H as a result of which node G has next hop node H and label Dh.

Referring now to FIG. 2, which shows the network topology following failure of node B, it will be seen that node A implements a repair path 200 to node D which can be any appropriate repair path for example of the type described above in Swallow et al or Miles et al. As a result the forwarding information at node A ensures implementation of the appropriate repair strategy for packets destined for node D. The forwarding information for the remaining nodes remains the same such that all packets arriving at node A will be forwarded to node D according to the repair mechanism invoked. However, once the network converges on the revised topology it will be seen that the forwarding information for each of nodes A, C, E, E, G, H will be to the next hop in the direction of node H as node D is now only reachable from node H. Accordingly, if different nodes update their forwarding information at different times then loops can arise. For example if node E updates its forwarding information before node F then it will forward packets destined for node D towards node F whereas node F will forward packets destined for node D to node E creating a loop.

A solution for avoiding loops during a routing transition is described in co-pending patent application Ser. No. 10/442,589, filed May 20, 2003, entitled "Method and Apparatus for Constructing a Transition Route in a Data Communications Network" of Stewart Bryant et al. ("Bryant et al"), the entire contents of which are incorporated by reference for all purposes as if fully set forth herein. According to the solution put forward in Bryant, when a network component fails, upstream nodes construct transition routes to destinations which would otherwise be reachable via the failed component. The transition routes are constructed by tunneling packets for the destination node to an intermediate node in an intersection of a first set of nodes reachable from the repairing node without traversing the failed component and a second set of nodes from which the destination node is reachable without traversing the first component. Although this is a very effective solution, it requires installation of a large number of tunnels.

Another solution is described in co-pending patent application Ser. No. 10/685,622 filed 14 Oct. 2003 entitled "Method and Apparatus for Generating Routing Information in a Data Communication Network" of Stefano Previdi et al ("Previdi et al)", the entire contents of which are incorporated by reference for all purposes as fully set forth herein. According to the solution set forth in Previdi et al, the furthest nodes upstream of a failed component and which are affected by the change are identified. Then updating of the FIBs of each node can be carried out sequentially using this knowledge to ensure that tables are updated in order from the furthest affected router such that loops do not occur. However this approach can be complex, for example in the presence of Shared Risk Link Groups (SRLG).

BRIEF DESCRIPTION OF THE DRAWINGS

The present invention is illustrated by way of example, and not by way of limitation, in the figures of the accompanying drawings and in which like reference numerals refer to similar elements and in which:

FIG. 11 is a flow diagram illustrating in more detail steps involved according to an optimization of the method;

FIG. 12 is a representation of an implementation time-line for the method of FIG. 11;

DETAILED DESCRIPTION OF THE PREFERRED EMBODIMENT

A method and apparatus for updating label-switched paths is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of updating label-switched paths
4.0 Implementation Mechanisms—Hardware Overview
5.0 Extensions and Alternatives
...

1.0 General Overview

The needs identified in the foregoing Background, and other needs and objects that will become apparent for the following description, are achieved in the present invention, which comprises, in one aspect, a method of updating label-switched paths for forwarding data in a data communications network in response to a change in a network. The method comprises the steps, performed at an updating node, of receiving notification of a network change, constructing a post-change label-switched path in the changed network, and, after termination of a first period, forwarding data using the post-change label switched path.

In other aspects, the invention encompasses a computer apparatus and a computer-readable medium configured to carry out the foregoing steps.

2.0 Structural and Functional Overview

Figure 3:
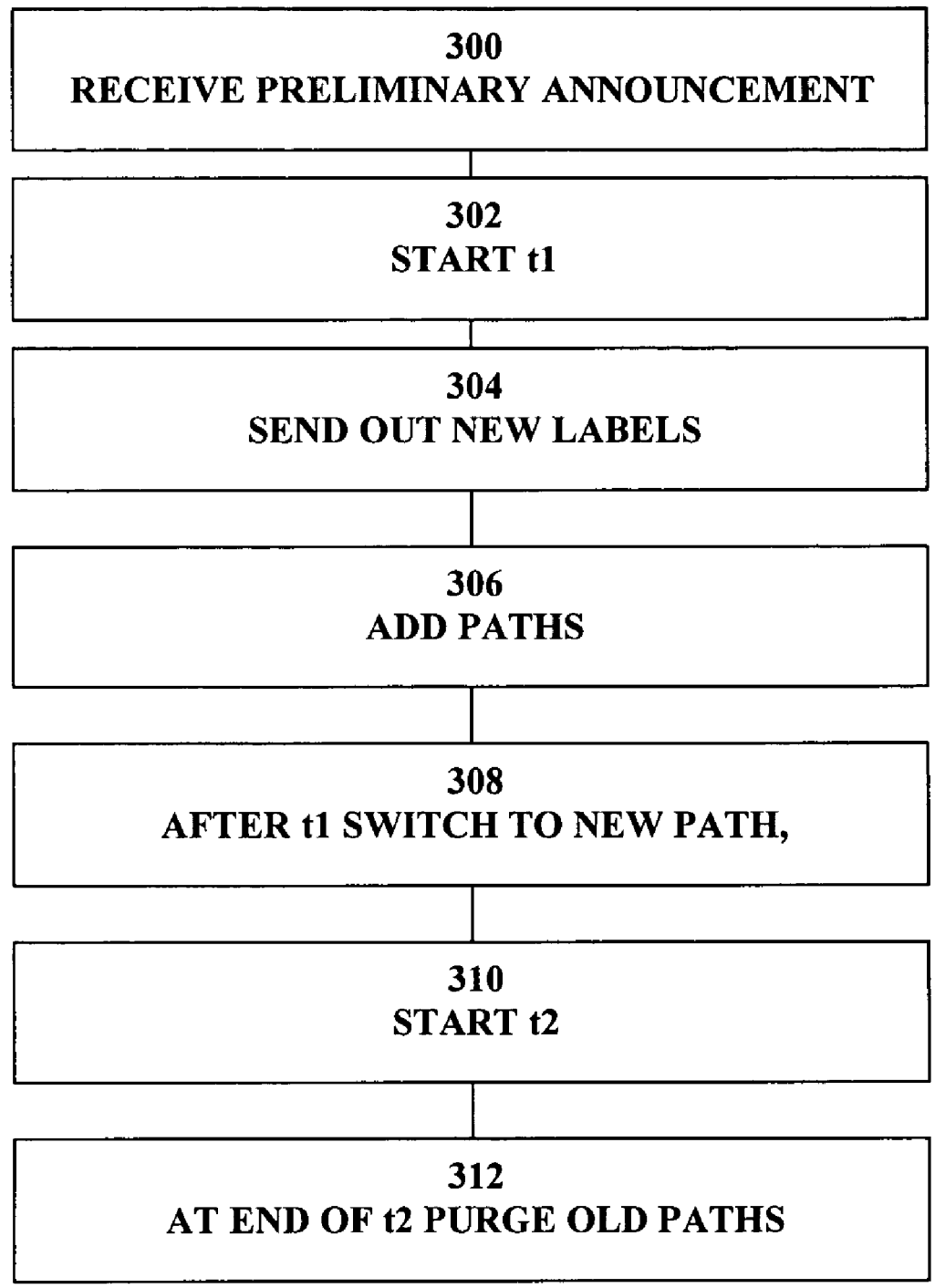
FIG. 3 is a flow diagram illustrating the steps involved in updating label-switched paths.

The method can be understood in overview with respect to FIG. 3 which is a flow diagram illustrating at a high level a method of updating label-switched paths. At step 300 an updating node, that is to say a node which will or may update its forwarding information following a topology change receives a notification of such a network topology change, for example a component failure. This is received in the form of a preliminary notification of such a nature that the updating node becomes aware of the topology change and can carry out the appropriate calculations in relation to the revised topology, but will not implement revised forwarding i.e., switch to a post-change topology label-switched path.

At step 302 the updating node commences a timer $t_1$, upon receipt of the covert announcement and at step 304 the updating node sends out a new ingress label for the respective FEC to its neighbors to allow construction of a post-change label-switched path. At step 306 the updating node adds any new forwarding information to its forwarding tables but does not yet switch to the new label-switched path. For example the updating node may include new egress labels and associated next hops received from its neighbors in conjunction with its own new ingress label. At step 308, after expiry of $t_1$, which is a period or epoch calculated to ensure that all affected nodes, that is to say, all nodes which have to make a change to their forwarding information, will have been able to add the new paths into their forwarding information, the updating node switches to the updated forwarding information and hence starts using the post-change topology. The updating node also retains the forwarding information for the old topology but starts a timer $t_2$ at step 310 upon termination of $t_1$. As step 312, after expiry of $t_2$, which is a period long enough to ensure that all affected nodes are now using the post-change topology forwarding information, the pre-change forwarding information is removed from the LFIB at the node.

Because of the provision of new or additional labels, looping is avoided upon implementation of the forwarding update. In particular this is because packets then forwarded according to the old topology are repaired as necessary or, if the node has switched to the new topology, assigned to the post-change topology label-switched path and with the corresponding new label. As all of the routers have added the new paths and corresponding forwarding information into their forwarding base then each one will swap its ingress new label with the correct egress new label as a result of which the packet is then locked into the post-change label-switched path. Hence, although there may be backtracking (in which the packet first progresses in one direction along the pre-change label-switched path and is then sent in the opposite direction along the post-change label-switched path) there will not be looping of the packet. The approach can be applied to incoming IP or MPLS packets and can be carried out in relation to any network change including failure of a component, or introduction of a component. In addition, various optimizations are available as discussed in more detail below.

3.0 Method of Updating Label-Switched Paths

Figure 1:
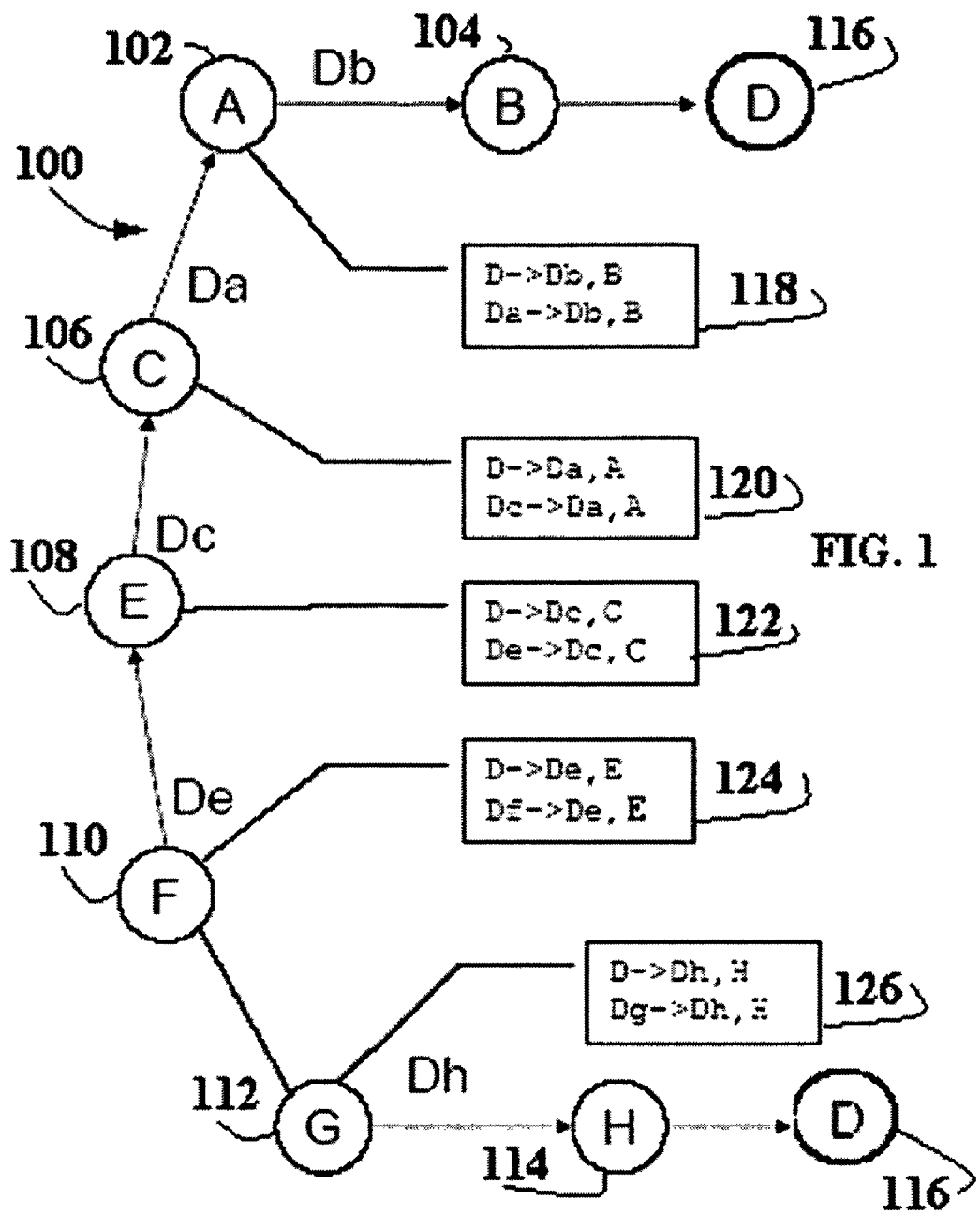
FIG. 1 is a representation of a network in relation to which the method may be applied.
Figure 2:
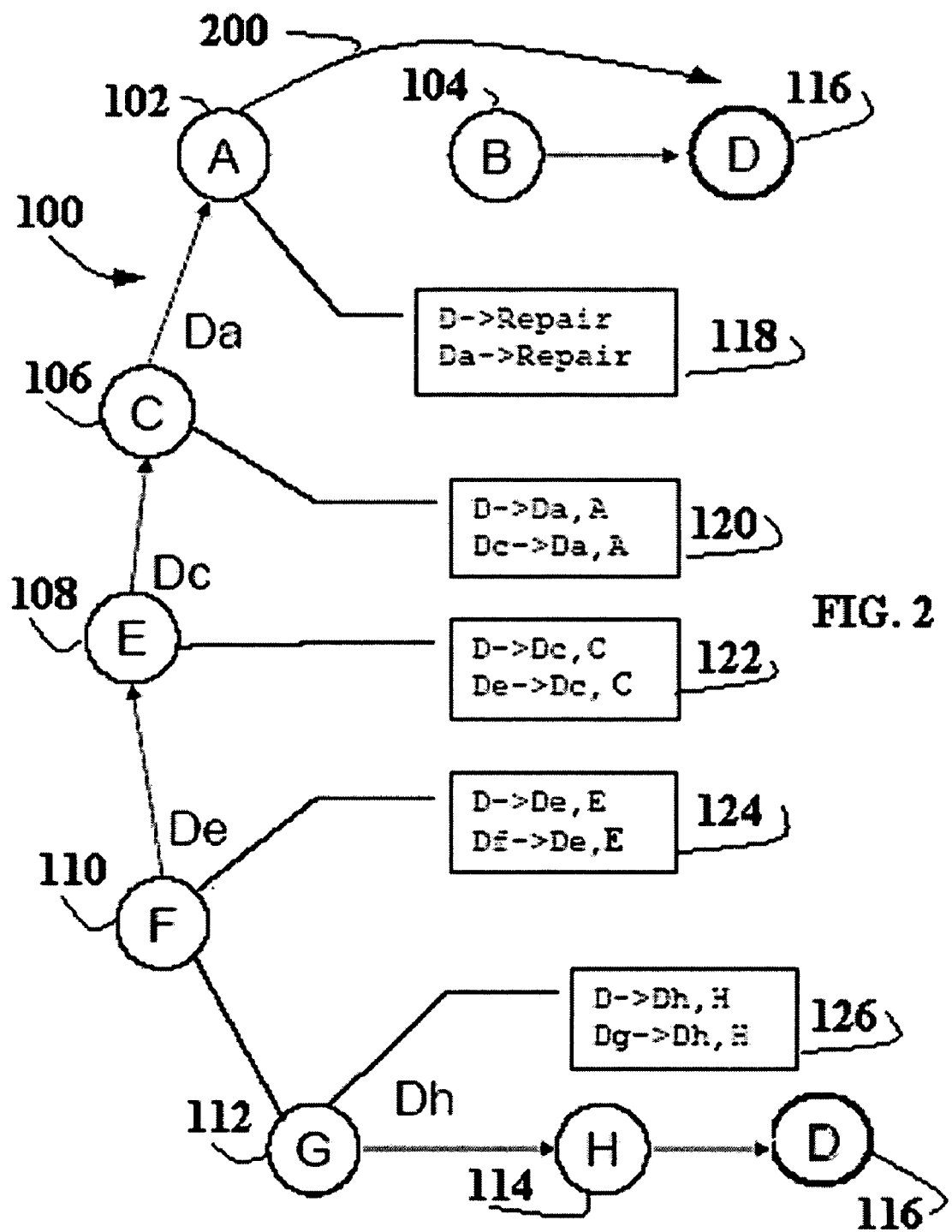
FIG. 2 is a representation of the network of FIG. 1 following a component failure.
Figure 8:
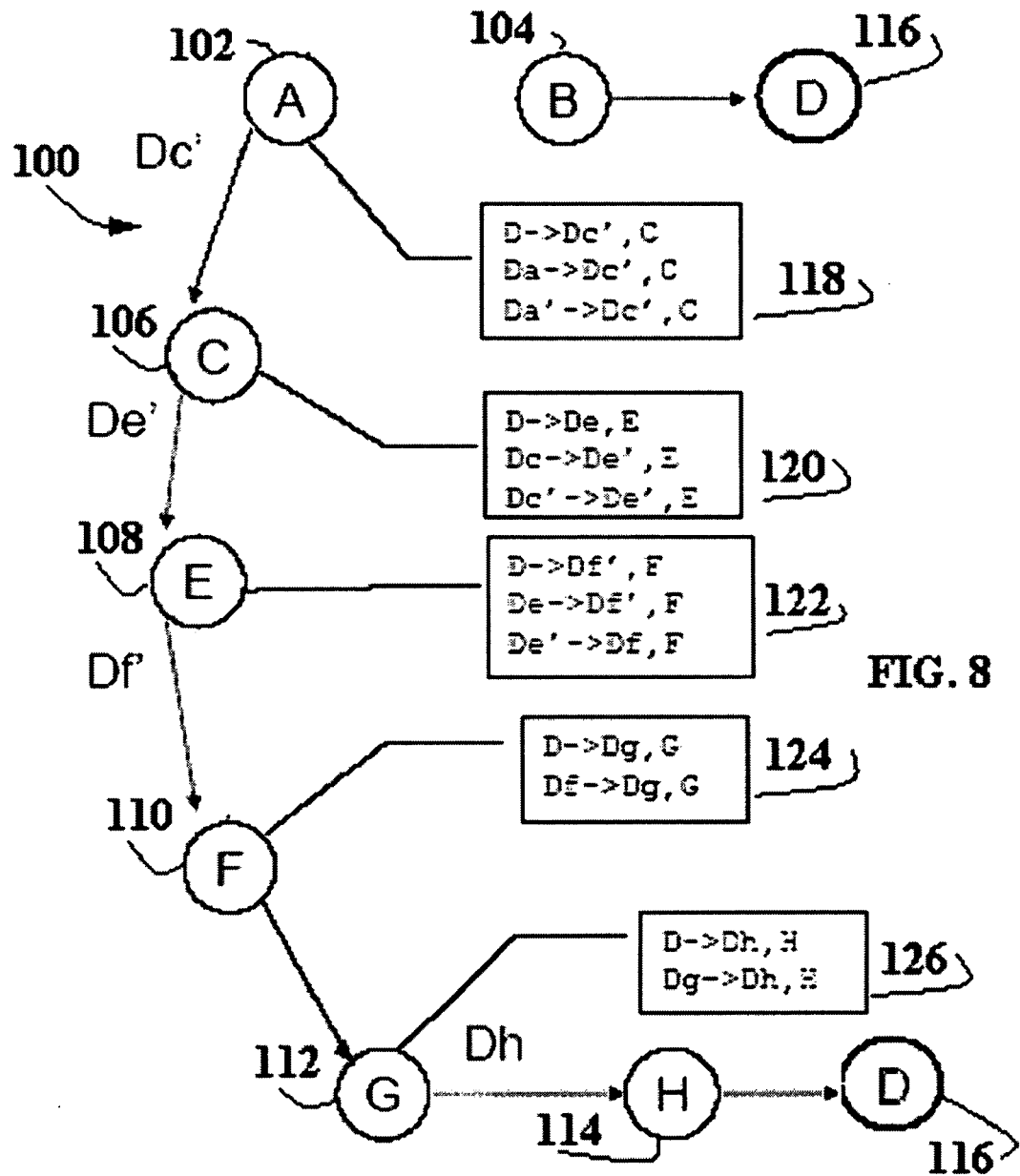
FIG. 8 is a representation of the network of FIG. 1 following updating of all forwarding information.
Figure 9:
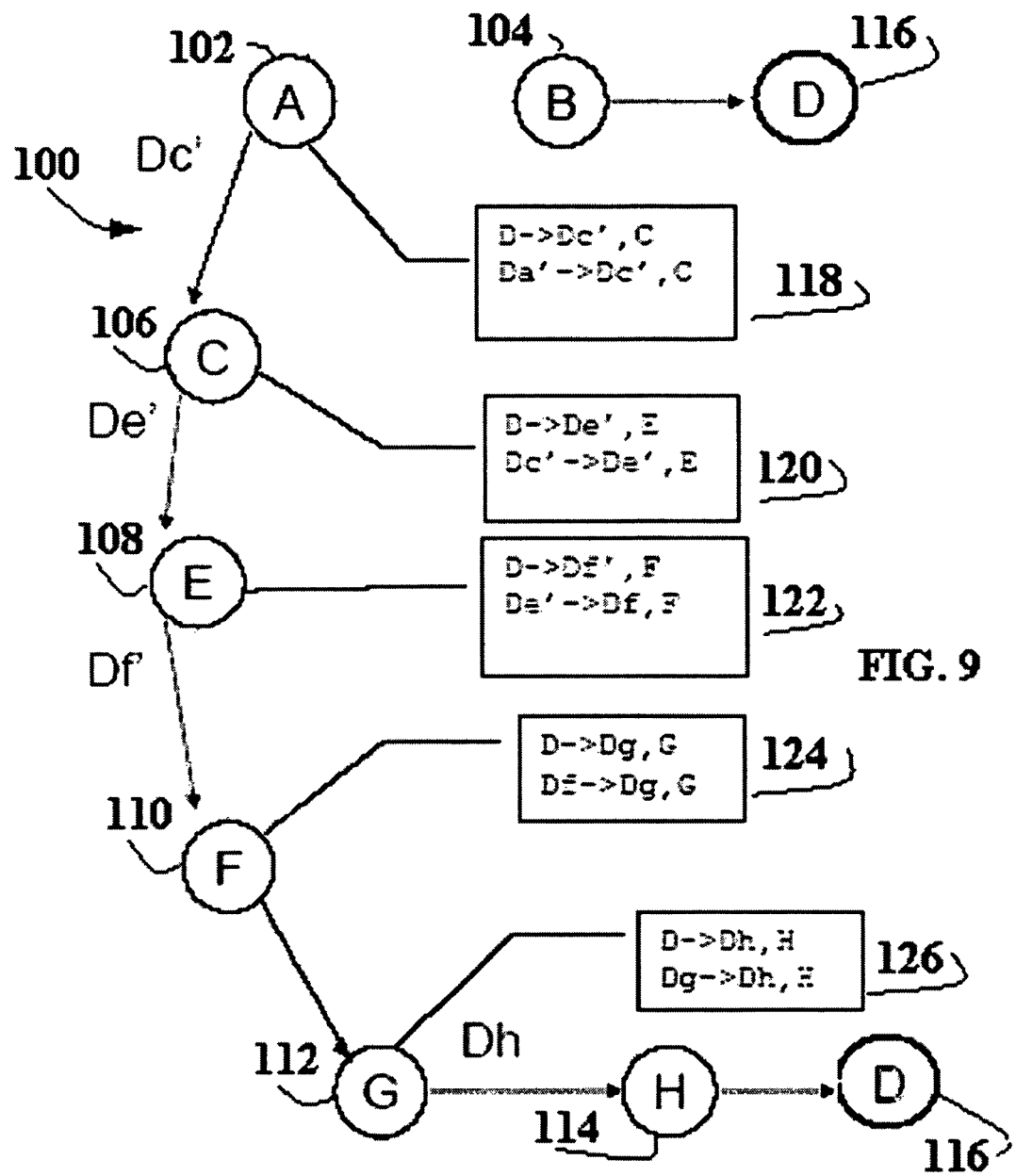
FIG. 9 is a representation of the network of FIG. 1 following removal of old label-switched paths.
Figure 10:
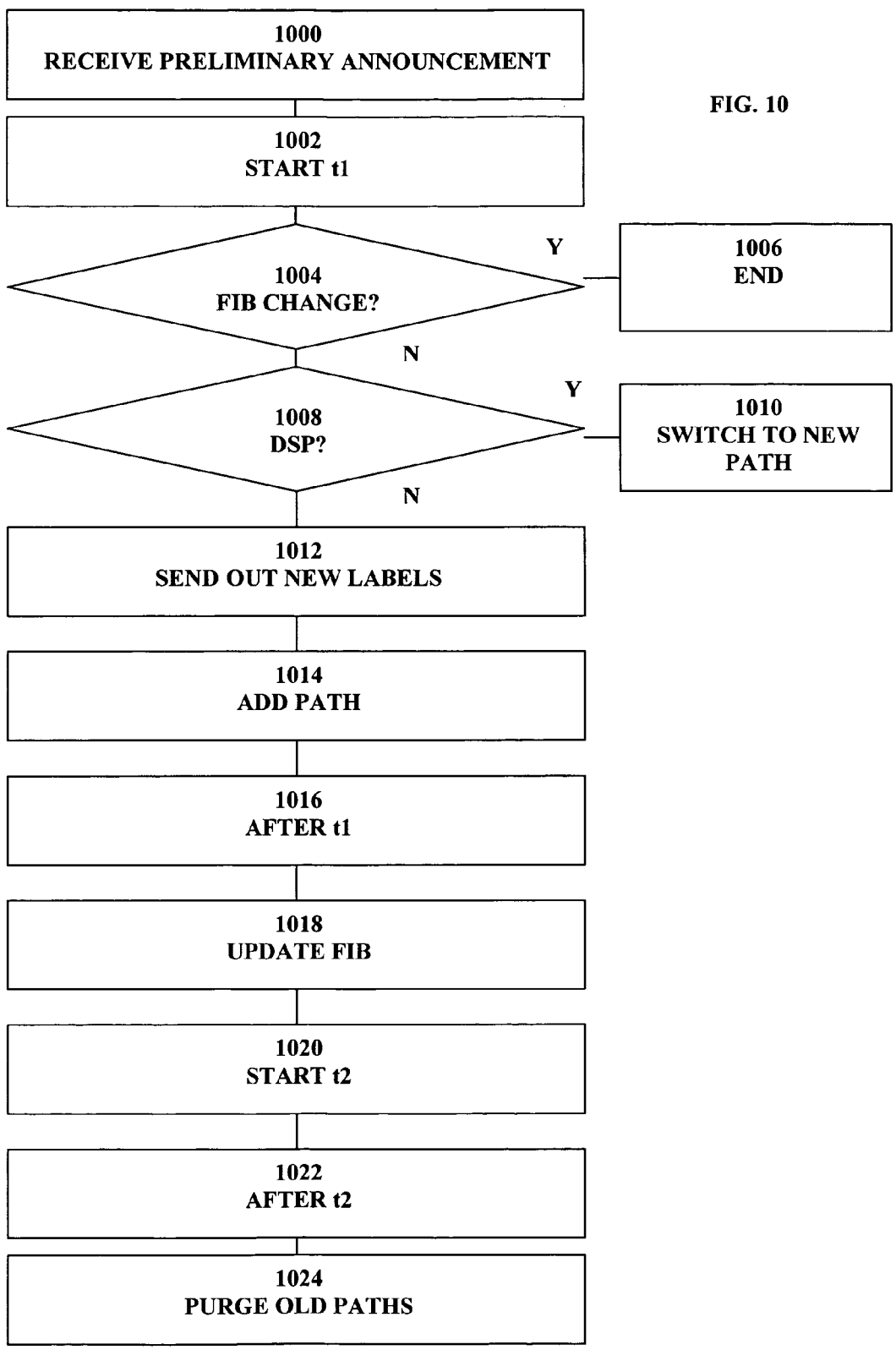
FIG. 10 is a flow diagram illustrating in more detail steps involved in implementing the present method.

The method will be described in more detail with respect to FIG. 4 to FIG. 9 which show the network of FIG. 1 and FIG. 2 at various stages of the update process, and FIG. 10 which is a flow diagram illustrating at a low level the method described herein.

At step 1000 an updating node receives a preliminary notification of a network change such as a network failure. This can be, for example, in the form of a special flooded link state packet indicating the topology change and which is recognized by the updating node as triggering the updating process described herein. The notification will be issued, inter alia, from the adjacent node to the failure (for example node A) which will be acting as an updating node and repairing node, which will invoke an appropriate repair mechanisms for example a repair mechanisms such as that described in Swallow et al or Miles et al.

At step 1002 a timer $t_1$ is started and at step 1004 the updating node establishes whether any changes to its FIB are required. If not, then at step 1006 the process stops as the node will be unaffected by convergence (for example node G). It will be appreciated, of course, that step 1004 is carried out on a per-destination basis at all routers. Step 1004 therefore provides an optimization, limiting the number of nodes or routers which are required to carry out the succeeding steps.

Figure 4:
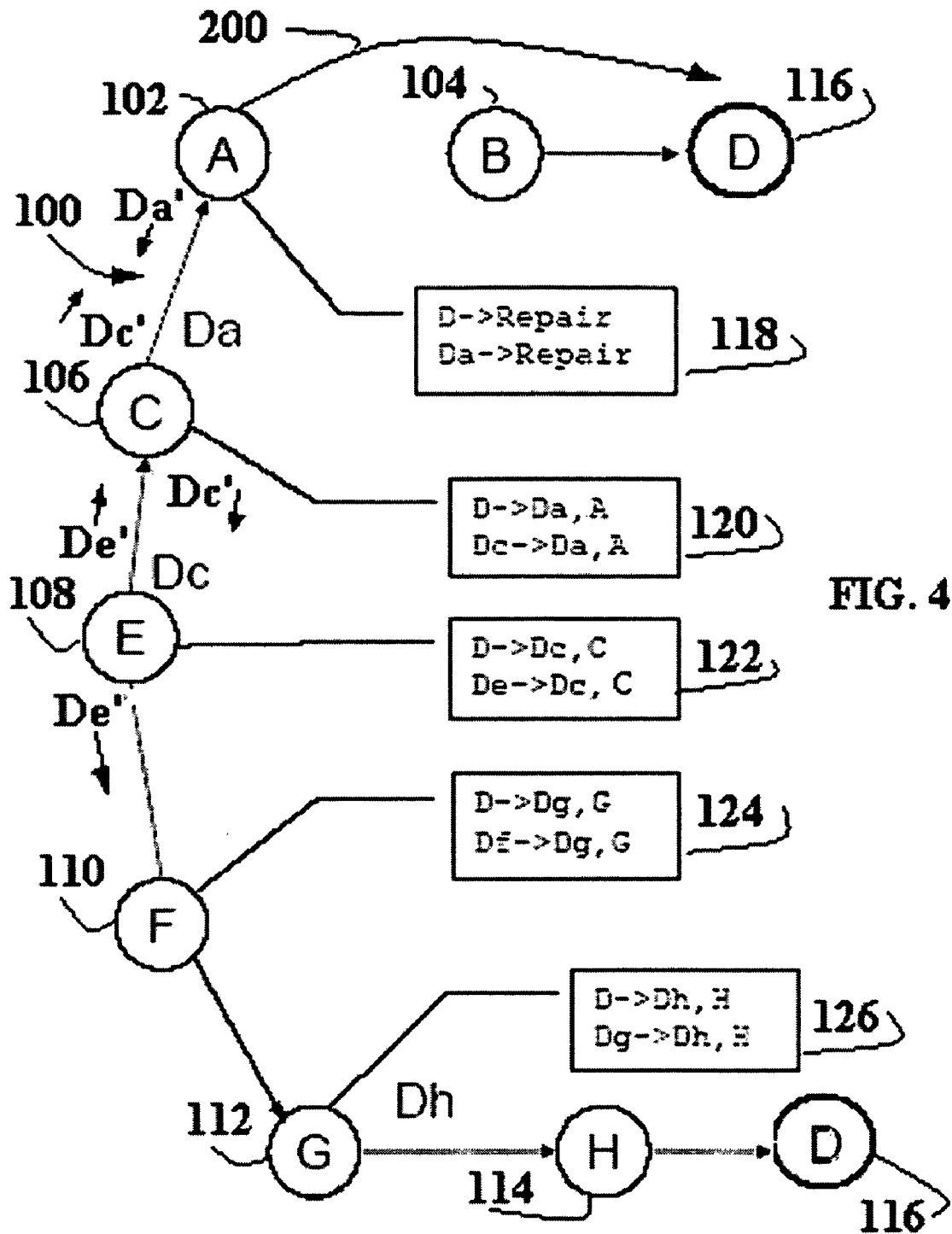
FIG. 4 is a representation of the network of FIG. 1 after a failure is notified.

At step 1008 the updating node establishes whether its next hop in the old topology comprises a downstream path, that is to say, is a node from which the path to the destination is less than or equal to that from the updating node, i.e., it is closer to the destination. If that is the case then at step 1010 the updating node can update its FIB immediately. This can be understood with reference to FIG. 1 compared to FIG. 3. In the pre-change topology shown in FIG. 1, node F has, as its next hop for destination D, node E. However in the post-change topology its next hop will be node G. In the pre-change topology node G's next hop for destination D is node H, that is to say, node G is a downstream path (DSP) for node F. As a result, as shown in FIG. 4, node F is able immediately to update its FIB such that all packets for destination D whether IP or MPLS are forwarded to node G as next hop with G as labeled Dg and does not need to advertise a new label. Because node G is a downstream path in the pre-change topology and the next hop in the post-change topology it cannot loop packets back. It will be appreciated that an updating node can calculate whether a neighbor comprises a downstream path simply by running an SPF based on their (common) network topology information, but rooted at the neighbor node.

At step 1012, if the new topology next hop is not an old topology downstream path then the updating node sends out its new label for the new topology. Referring once again to FIG. 4, for example, node A sends its new label Da' to node C. Node C sends its label Dc' to nodes A and E and node E sends out its new label De' to nodes C and F. In an optimization, each node only sends its new labels to update capable routers, that is to say, routers configured to implement the method described herein.

Figure 5:
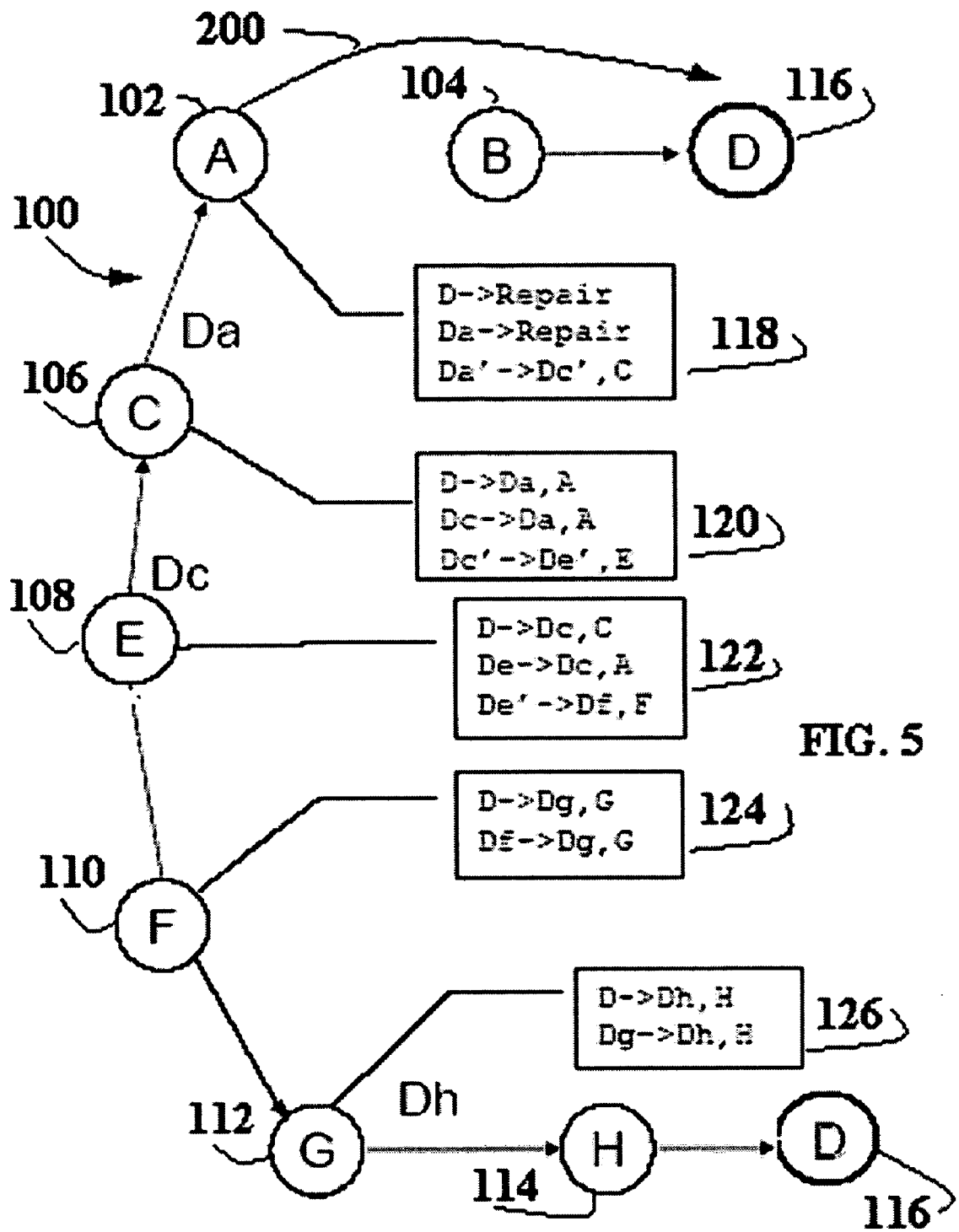
FIG. 5 is a representation of the network of FIG. 1 after constructing a new label-switched path.
Figure 6:
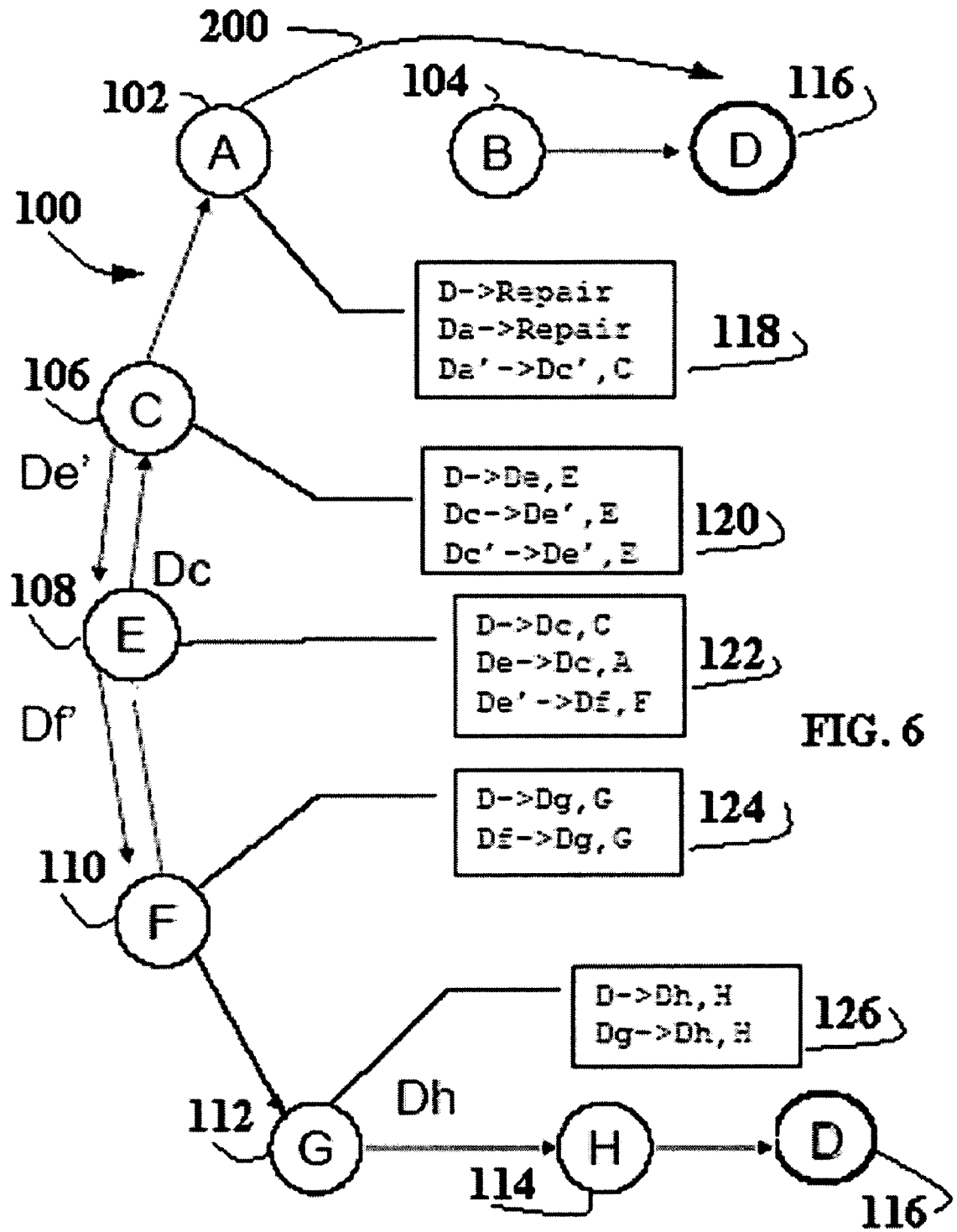
FIG. 6 is a representation of the network of FIG. 1 following switching to a new label-switched path according to a first ordering.

At step 1014 each node adds the post-change new topology path to its forwarding information, that is to say adding the new ingress and egress labels and corresponding next hop to its LFIB allowing MPLS label translation. However the updating node does not yet remove the old label and does not yet use the new label to forward packets. Accordingly the updating node prepares to forward using the new label on the new path, but does not yet use it. Any packets received continue to be forwarded according to the pre-change topology, using the pre-change labels, towards the repair. Referring to FIG. 5, therefore, node A retains its repair forwarding instruction for destination D and ingress label Da, but adds a new forwarding instruction for packets with ingress label Da' which will be swapped with C's label Dc', next hop C. Similarly node C adds a forwarding instruction next hop E, egress label De' for ingress label Dc' and node E adds an instruction next hop F, egress label Df for ingress label De'. It will be noted that node E uses node F's old label as node F did not need to send out a new label as described above.

At step 1016, after expiry of timer $t_1$ the updating node, that was delaying converging, switches to its new path for both the new and the old labels. In particular each node updates its forwarding instruction for packets to use the received new labels as egress labels for incoming packets with the old labels, or, in the case of IP packets, with the corresponding destination.

It will be seen that even if, at this stage, only node C has changed over to the post-change topology, looping will not take place. For example if node C receives a packet from node E with ingress label Dc, then node C will backtrack the packet to node E with egress label De'. However node E will then forward the packet to node F swapping ingress label De' with egress label Df.

Figure 7:
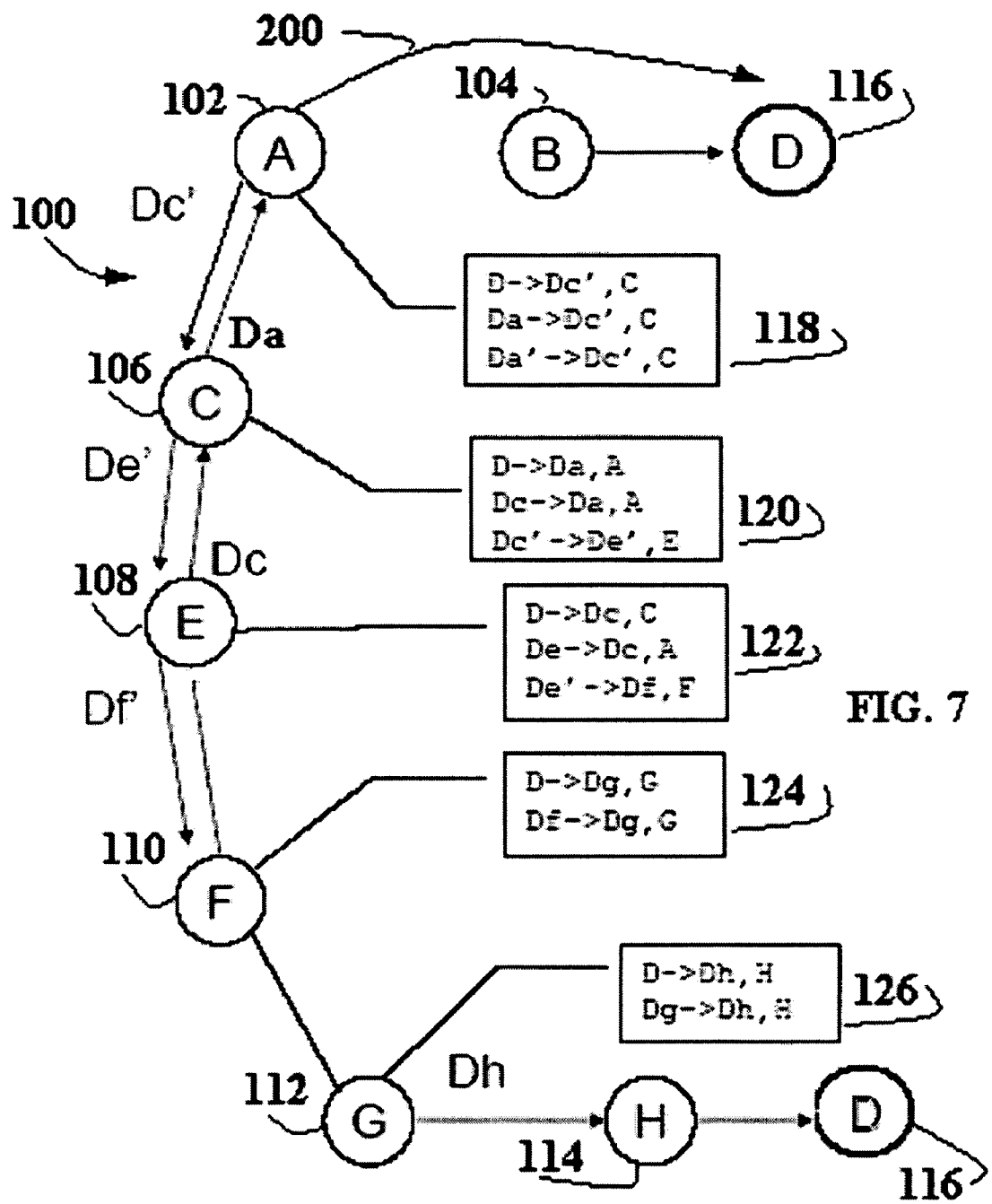
FIG. 7 is a representation of the network of FIG. 1 following according to a second ordering.

Furthermore, as can be seen from FIG. 7, the switch to the new topology label-switched path can be implemented in any order. For example if node A is the first node to update its label-switched path, forwarding IP packets destined for D to node C with label Dc' and packets with ingress label Da to node C also with egress label Dc', then even if nodes E and C have not correspondingly updated their forwarding information, looping does not occur. Hence where node E sends a packet for destination D with egress label Dc to node C and node C swaps the ingress label Dc to Da and forwards to node A, then node A will simply backtrack the packet to node C with label Dc' and node C will forward the packet to node E with label De'. Node E swaps to egress label Df and forwards to F after which the packet proceeds to D via nodes G and H.

The duration of epoch time $t_1$ must be equal to or greater than the longest period for any router in the network to receive the preliminary announcement and update its label-switched path. For example this can be derived by taking the greatest expected times for each of those steps and adding a small additional error factor. Alternatively the epoch can be terminated in other manners. For example node A may issue a second, subsequent announcement acting as a termination signal on expiry of a timer at that node. This approach will apply equally as long as the subsequent announcement is only issued once all routers can be expected to have carried out all changes required by the preliminary announcement.

At step 1018, therefore, the updated node updates its FIB and LFIB and, because the new label-switched path was installed during the preliminary phase, packets reach their destination via the appropriate mechanism without looping. If the packets do not go via any node using a new label they go via the repairing node and the repair path (that is node A and its repair path). However if the packets need a router that is exclusively using the new labels then they are marked with the new labels and reach their destination using the new path, into which they are locked, backtracking if necessary.

At step 1020, a further timer $t_2$ is started upon termination of $t_1$ and at step 1022, after expiry of the timer $t_2$, then at step 1024 the updating node removes the pre-change topology forwarding information. In particular, as shown in FIG. 8, during period $t_2$, all of the nodes update their forwarding tables appropriately. As shown in FIG. 9, at the expiry of the period $t_2$, the nodes remove the old label-switched paths. Accordingly node A removes the forwarding instructions for ingress label Da, node C for ingress label Dc and node E for ingress label De. It will be appreciated that, as an alternative each node can assign its old labels to the new path and update its forwarding table appropriately, although this requires additional LFIB updating steps.

As discussed above, in an optimization, if a node identifies its new next hop as a downstream path in the old topology it can update its FIB immediately. It will be seen that this approach can be extended, for example to identify whether a next-next hop is a downstream path.

Referring to FIG. 11, which is a flow diagram illustrating operation of such an optimization, in step 1100 an updating router receives notification of a network change and at step 1102 the router checks whether its new next hop is a downstream path in which case, as discussed above, at step 1104 the node updates its FIB immediately. Otherwise, at step 1106 a timer $t_3$ is started and at step 1108 the updating router computes whether its new next-next hop that is to say a node in its post-change path to a given destination once removed from the next hop comprises a downstream path for example by running an SPF rooted at the next-next hop. If not, then in step 1110 the method described above is implemented to ensure there is no looping during converging. However if the updating node's next-next hop is a downstream path then, at step 1112, after expiry of timer $t_3$, the updating node updates its forwarding table and starts sending packets destined for the destination to its next hop. As its next hop will have already been forwarding packets to its downstream path node, looping will not occur. For example, referring to FIG. 4, node F has begun forwarding packets destined for node D to node G, having identified it as a downstream path. Node E identifies node G as a next-next hop comprising a downstream path in the new topology and so can forward packets to node F. However to avoid looping, node E must wait an appropriate period until node F has changed over its FIB (see FIG. 10, step 410), introducing a further epoch as discussed below.

As a result it can be seen that neither node E nor node F needs to send new labels in these circumstances nor remove old labels from their forwarding tables although there is an additional computational burden in running further SPFs per-destination. It will further be seen that this approach can be extended, with appropriate additional timing epochs to more remote next hops as appropriate although in practice it is found that a very significant proportion of nodes during a topology change have a downstream route within two hops.

It will further be appreciated that this repair approach extends beyond MPLS configurations to any approach where packets are locked, in a locked-in state, into a topology and corresponding path during a locked-in period of a transition, for example in the form of tunnels or using Multi Topology Routing (MTR) techniques.

The epochs applied using this further optimization can be further understood with reference to FIG. 12 which is a timing diagram showing, on the x-axis, time t and on the y-axis propagation through a network. At a time $t_o$, reference number 1200, a preliminary announcement is issued by a repairing router (for example node A in FIG. 1) and propagation of this announcement through the network is shown generally by time line 1202. At a time $t_3$ designated 1204 updating nodes, having identified a new next-next hop as a downstream path can begin forwarding packets to their next hop as described with reference to FIG. 11. Time $t_3$ may correspond to a time $t_1$ as discussed with reference to FIG. 10 comprising a time after which all nodes can be expected to have added the relevant new paths to their LFIBs, or it may be a different period. For the sake of example, time $t_1$ is shown in FIG. 12 at 1206 as occurring later than time $t_3$ and corresponds to the point at which a router begins assigning packets to the new label-switched path. As discussed above, time $t_1$, may in fact represent receipt of a notification from the repairing node as an alternative. Finally at a time $t_2$, 1208, updating nodes remove old path information from their forwarding tables as described above with reference to FIG. 10. Generally it will be appreciated that timers can be implemented at each node, or that, after receipt of the preliminary notification, each epoch may be terminated commenced by a signal received from, for example, the original notification issuing node.

Figure 13:
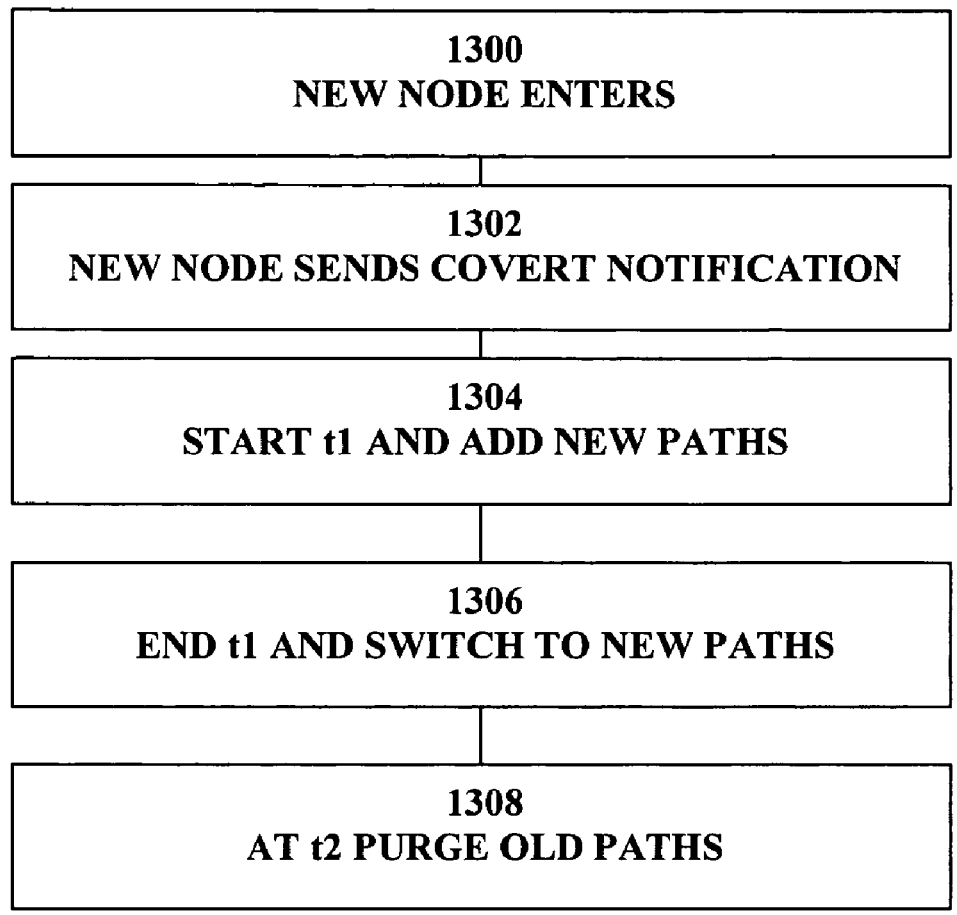
FIG. 13 is a flow diagram illustrating implementation of the method upon introduction of a new component.

It will be recognized that the approaches described herein can be applied to other network changes than component failures. For example the method can be applied in the case of "good news" for example where a new component is introduced or a component cost decreases. It will be seen that the approach described above can be applied in this manner as well although in a time-reverse way. Operation in this case can be understood with reference to FIG. 13 which is a flow diagram illustrating the method applied.

At step 1300 a new node is introduced: for example node B can be reintroduced in the example described above. The new node acquires its topology information, issues its new labels and receives the labels issued by its neighbors to construct its FIB such that it is ready to start forwarding but has not yet announced itself and therefore is receiving no packets.

At step 1302 the new node sends a preliminary announcement to the other nodes in the network that it is part of the topology. At step 1304 each updating node starts a timer $t_1$ and adds the new paths to its FIBs but does not yet switch to them. At step 1306, upon expiry of $t_1$ all of the updating nodes switch to their new paths. Of course this can, alternatively, be on receipt of a subsequent notification from the new node B. Once again, because the new label paths are fully installed before the subsequent announcement or expiry of timer $t_1$, routers can change to the new path from the old path in any order without looping. At step 1308, after expiry of the further timer $t_2$, the updating nodes purge their FIBs of the old path information as discussed above. It will be seen that the optimizations discussed above can be applied as appropriate. For example if a node identifies that its new next hop is also a downstream path in the new topology it can begin forwarding immediately in the same manner as discussed above without looping. Furthermore, nodes adjacent to the newly introduced node can change to the new path immediately or when other nodes change. Yet further nodes can identify next-next hop downstream paths and so forth as discussed above.

It will be see that in the case of legacy routers, i.e., routers without update capability, the preliminary notification may take the form of a "covert" announcement not recognizable by the legacy routers. Legacy routers may be treated in any appropriate maneuver, for example by tunneling the packets using IP or MPLS tunneling, around them.

It will be seen that, as a result of the approaches described above, loop free convergence is provided in a simple and rapid manner requiring as few as two epochs and applicable both for removal and introduction of components.

The mechanisms by which the method and optimizations discussed above are implemented will be well known to the skilled reader and do not require detailed discussion here. For example the manner in which the repair paths are computed, the MPLS labels pushed and exchanged, the preliminary notification issued and recognized, epochs observed and LFIBs updated can be implemented in any appropriate manner such as hardware or software and using for example micro-code.

The approach can be used in any MPLS/LDP router for both spontaneous network changes (for example network failures) as well as loop-free transition during network management operation.

4.0 Implementation Mechanisms—Hardware Overview

Figure 14:
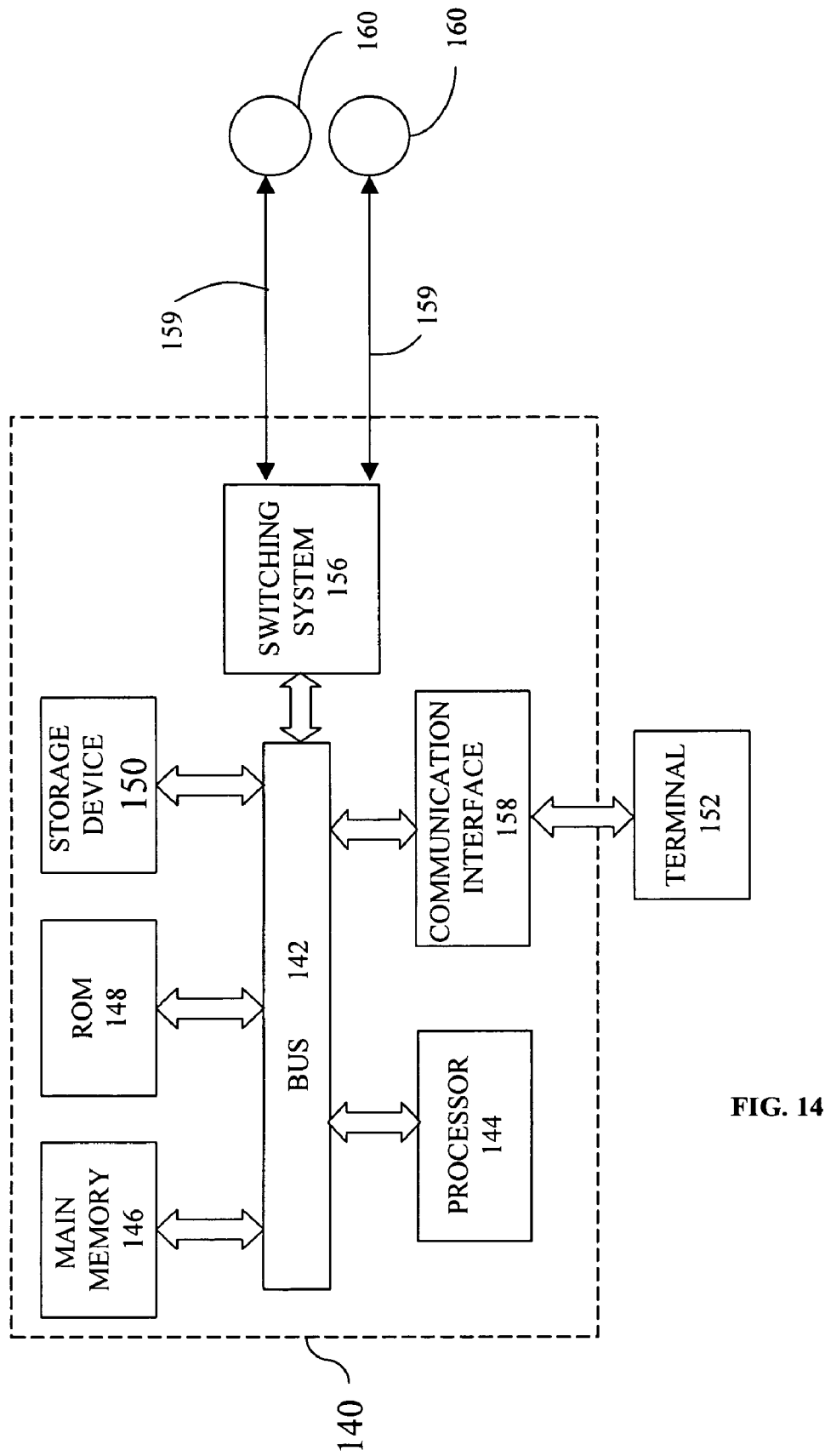
FIG. 14 is a block diagram that illustrates a computer system upon which a method forwarding data may be implemented.

FIG. 14 is a block diagram that illustrates a computer system 40 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as an updating or repairing node the above described method of forwarding data. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the worldwide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Any appropriate routing protocol and mechanism can be adopted to implement the invention. The method steps set out can be carried out in any appropriate order and aspects from the examples and embodiments described juxtaposed or interchanged as appropriate.

Any appropriate implementation of MPLS and any appropriate label distribution protocol can be adopted to implement the invention. Similarly, where required, any appropriate link state protocol such as intermediate system-intermediate system (IS-IS) or open shortest path first (OSPF) can be implemented. Link state protocols of this type are well understood by the skilled reader and well documented in pre-existing documentation, and therefore are not described in detail here. Similarly any appropriate network can provide the platform for implementation of the method.

It will be appreciated that the various epochs can be driven by timing mechanisms within each router, global timing mechanism or signaling as appropriate.

What is claimed is:

1. A method of updating label-switched paths for forwarding data in a data communications network in response to a change in a network comprising the steps, performed at an updating node of:

receiving notification of a network change;
commencing at the updating node a first period timer having a first period and a second period timer having a second period;
constructing a post-change label-switched path to a destination node in the changed network;
in response to receiving a packet for forwarding to the destination node, determining whether a next hop node toward the destination node in the post-change network is downstream a pre-change label-switched path toward the destination node in the pre-change topology, and, if so, forwarding the packet to the next hop node using the pre-change label-switched path in the pre-change topology as though the first period is terminated, otherwise, waiting until termination of the first period and forwarding the packet using the post-change label-switched path in the changed network only after termination of the first period; and
at the updating node, after termination of the second period subsequent to termination of the first period, removing the pre-change label-switched paths;
wherein the updating node comprises the one or more computing devices.

2. A method as claimed in claim 1 further comprising identifying whether a next hop of a next hop comprises a downstream path in the pre-change topology.

3. A method as claimed in claim 1 in which termination of the first period occurs upon termination of a timer at the updating node.

4. A method as claimed in claim 1 in which termination of the first period occurs upon receipt by the updating node of a termination signal.

5. A method as claimed in claim 1 in which the step of constructing a post-change label-switched path comprises assigning a post-change label to the post-change label-switched path.

6. A method as claimed in claim 1 in which the network change comprises one of a network component failure or introduction of a network component.

7. A method as claimed in claim 1 in which data to be forwarded comprises one of an IP or MPLS data packet.

8. A method as claimed in claim 1 further comprising the step of forwarding data.

9. A computer readable volatile or non-volatile storage medium storing one or more sequences of instructions for updating a label-switched path which, when executed by one or more processors, cause the one or more processors to perform the steps of:

receiving notification of a network change;
commencing at the updating node a first period timer having a first period and a second period timer having a second period;
constructing a post-change label-switched path to a destination node in the changed network;
in response to receiving a packet for forwarding to the destination node, determining whether a next hop node toward the destination node in the post-change network is downstream a pre-change label-switched path toward the destination node in the pre-change topology, and, if so, forwarding the packet to the next hop node using the pre-change label-switched path in the pre-change topology as though the first period is terminated;
if the next hop node in the post-change network is downstream the pre-change label-switched path in the post-change topology, waiting until termination of the first period and forwarding the packet using the post-change label-switched path; and
at the updating node, after termination of the second period subsequent to termination of the first period, removing the pre-change label-switched paths.

10. A computer readable volatile or non-volatile storage medium as claimed in claim 9, further comprising instructions which, when executed, cause termination of the first period upon receipt by the updating node of a termination signal.

11. A computer readable volatile or non-volatile storage medium as claimed in claim 9, in which the instructions which, when executed, cause constructing the post-change label-switched path, further comprise instructions which, when executed, cause assigning a post-change label to the post-change label-switched path.

12. A computer readable volatile or non-volatile storage medium as claimed in claim 9, in which the network change comprises one of a network component failure or introduction of a network component.

13. An apparatus for updating a label switch path comprising:

one or more processors;
one or more instructions, which when executed by the one or more processors, cause the one or more processors to perform:
receiving notification of a network change;
commencing at the updating node a first period timer having a first period and a second period timer having a second period;
constructing a post-change label-switched path to a destination node in the changed network;
determining, in response to receiving a packet for forwarding to the destination node, whether a next hop node toward the destination node in the post-change network is downstream a pre-change label-switched path toward the destination node in the pre-change topology, and, if so, forwarding the packet to the next hop node using the pre-change label-switched path in the pre-changed topology as though the first period is expired, otherwise, waiting until termination of the first period and forwarding the packet using the post-change label-switched path in the changed network after termination of the first period only after termination of the first period; and
removing, at the updating node, the pre-change label-switched paths after termination of the second period subsequent to termination of the first period.

14. An apparatus as claimed in claim 13, further comprising instructions which, when executed, cause termination of the first period upon receipt by the updating node of a termination signal.

15. An apparatus as claimed in claim 13, in which the instructions which, when executed, cause constructing the post-change label-switched path, further comprise instructions which, when executed, cause assigning a post-change label to the post-change path.

16. An apparatus as claimed in claim 13, in which the network change comprises one of a network component failure or introduction of a network component.

17. An apparatus for updating a label-switched path comprising:

one or more processors;

a network interface communicatively coupled to the one or more processors and configured to communicate one or more packet flows among the one or more processors in a network; and a computer readable volatile or non-volatile medium storing one or more sequences of instructions for updating the labels-switched path which, when executed by one or more processors, cause the one or more processors to perform the steps:

receiving notification of a network change;

commencing at the updating node a first period timer having a first period and a second period timer having a second period;

constructing a post-change label-switched path to a destination node in the changed network;

determining, in response to receiving a packet for forwarding to the destination node, whether a next hop node toward the destination node in the post-change network is downstream a pre-change label-switched path toward the destination node in the pre-change topology, and, if so, forwarding the packet to the next hop node using the pre-change label-switched path in the pre-change topology as though the first period is terminated, otherwise, waiting until termination of the first period and forwarding the packet using the post-change label-switched path in the changed network only after termination of the first period; and at the updating node, after termination of the second period subsequent to termination of the first period, removing the pre-change label-switched paths.

18. An apparatus as claimed in claim 17, further comprising instructions which, when executed, cause termination of the first period upon receipt by the updating node of a termination signal.

19. An apparatus as claimed in claim 17, in which the instructions which, when executed, cause constructing the post-change label-switched path, further comprise instructions which, when executed, cause assigning a post-change label to the post-change path.

20. An apparatus as claimed in claim 17, in which the network change comprises one of a network component failure or introduction of a network component.

\* \* \* \* \*